US009137974B2

(12) United States Patent
Boehm

(10) Patent No.: US 9,137,974 B2
(45) Date of Patent: Sep. 22, 2015

(54) SYSTEMS, DEVICES, AND/OR METHODS FOR FEEDING BIRDS

(71) Applicant: Thomas Boehm, Charlottesville, VA (US)

(72) Inventor: Thomas Boehm, Charlottesville, VA (US)

( * ) Notice: Subject to any disclaimer, the term of this patent is extended or adjusted under 35 U.S.C. 154(b) by 41 days.

(21) Appl. No.: 14/141,672

(22) Filed: Dec. 27, 2013

(65) Prior Publication Data
US 2014/0182518 A1 Jul. 3, 2014

Related U.S. Application Data

(60) Provisional application No. 61/746,555, filed on Dec. 27, 2012.

(51) Int. Cl.
*A01K 31/00* (2006.01)
*A01K 39/01* (2006.01)
*A01K 5/02* (2006.01)
*A01K 39/014* (2006.01)

(52) U.S. Cl.
CPC .............. *A01K 39/01* (2013.01); *A01K 5/0291* (2013.01); *A01K 31/007* (2013.01); *A01K 39/014* (2013.01)

(58) Field of Classification Search
CPC ..... A01K 31/00; A01K 31/007; A01K 39/00; A01K 39/14; A01K 39/06; A01K 5/0291

USPC ......................................................... 119/429
See application file for complete search history.

(56) References Cited

U.S. PATENT DOCUMENTS

| | | | |
|---|---|---|---|
| 3,295,498 A | | 1/1967 | Brown |
| 3,468,291 A * | | 9/1969 | Allen ........................ 119/51.12 |
| 4,112,871 A * | | 9/1978 | Newman ....................... 119/464 |
| 4,722,300 A | | 2/1988 | Walker |
| 4,981,106 A * | | 1/1991 | Nagatomo .................. 119/51.11 |
| 5,134,970 A * | | 8/1992 | Oh ................................ 119/428 |
| D351,690 S * | | 10/1994 | Honeycutt ..................... D30/124 |
| 5,377,620 A * | | 1/1995 | Phillippi .................... 119/51.12 |
| 5,950,567 A * | | 9/1999 | Sheaffer et al. .............. 119/477 |
| 5,975,024 A * | | 11/1999 | Sheaffer ........................ 119/477 |
| 6,321,686 B2 | | 11/2001 | Geis |
| 6,363,886 B1 | | 4/2002 | Statton |
| 6,899,542 B2 * | | 5/2005 | Kurokawa ..................... 434/236 |
| 2012/0060761 A1* | | 3/2012 | Laro ........................... 119/51.11 |

* cited by examiner

*Primary Examiner* — Kristen C Hayes
(74) *Attorney, Agent, or Firm* — Dale Jensen, PLC; Dale R. Jensen

(57) ABSTRACT

Certain exemplary embodiments can provide a method, which can comprise a plurality of activities, which can comprise automatically detecting the presence of a bird in a housing. The housing can be adapted to substantially surround the bird. The housing can define an aperture adapted for the bird to enter and exit the housing.

17 Claims, 5 Drawing Sheets

SYSTEMS, DEVICES, AND/OR METHODS FOR FEEDING BIRDS

CROSS-REFERENCES TO RELATED APPLICATIONS

This application claims priority to, and incorporates by reference herein in its entirety, U.S. Provisional Patent Application Ser. No. 61/746,555, filed 27 Dec. 2012.

BRIEF DESCRIPTION OF THE DRAWINGS

A wide variety of potential embodiments will be more readily understood through the following detailed description of certain exemplary embodiments, with reference to the accompanying exemplary drawings in which.

DETAILED DESCRIPTION

Figure 1:
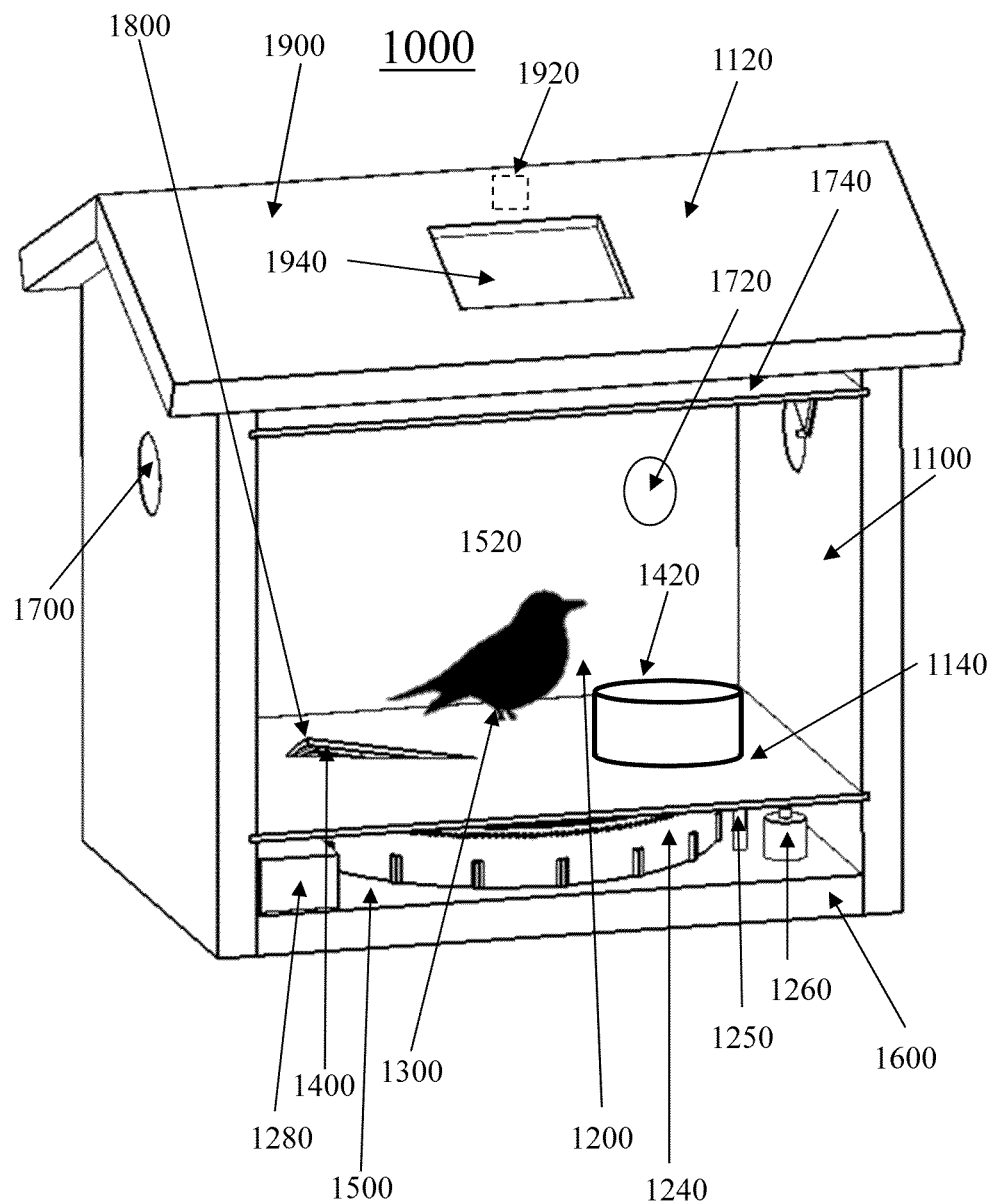
FIG. 1 is a drawing of a perspective view of an exemplary embodiment of a system 1000.

FIG. 1 is a drawing of a perspective view of an exemplary embodiment of a system 1000, which can comprise a housing 1100. Housing 1100 can comprise a feeding chamber 1520 and a substantially transparent portion 1200, which can be glass or a clear plastic substance for viewing. Housing 1100 can define a plurality of apertures 1700. Each of plurality of apertures 1700 can be sized to allow passage of a bird 1300, which can be a small bird (e.g., a bluebird), into feeding chamber 1520. Feeding chamber 1520 can provide bird 1300 with access to an opening in a removable floor 1140 from which food such as insects can be stored. In certain exemplary embodiments, system 1000 can comprise a compartmented carousel 1240 located under floor 1800. A set of gears 1250 and a battery powered motor 1260 can cause carousel 1240 to rotate to sequentially expose a plurality of compartments of the carousel to bird 1300 through opening in floor 1800. In certain exemplary embodiments, each of the compartments can comprise a separate supply of food. In certain exemplary embodiments, each of the compartments 1400 can be exposed to bird 1300 at predetermined time intervals responsive to motion of the carousel caused by a timer 1280. System 1000 can comprise a food dish 1420, which can be adapted to hold bird food that is no longer living (e.g., bird seed, dead insects, etc.).

System 1000 can comprise a bell 1920 housed in the attic 1900. Bell 1920 can ring responsive to a new compartment of the carousel being exposed to bird 1300. Bell 1920 can alert birds such as bird 1300 to new food being exposed in system 1000. In this example item 1920 is a bell but any sound device can be used such as a speaker, transducer, etc.

Transparent portion 1200 can comprise a painted or frosted portion 1500, which can conceal the carousel, the food supply, and the carousel rotating mechanism (for clarity, painted or frosted portion 1500 is shown as clear and transparent in FIG. 1, but is painted or frosted in certain exemplary embodiments). System 1000 can comprise a base 1600, which can be adapted to support the carousel and other components of system 1000. System 1000 can define one or more apertures 1700. Because one or more apertures 1700 are in optically opaque portions of system 1000, one or more apertures 1700 are more visible to bird 1300 for entering and exiting purposes. Certain exemplary embodiments can provide a substantially transparent capture compartment accessed by one or more apertures 1700. The substantially transparent capture compartment can be used to capture and potentially dispose of unwanted bird species such as House Sparrows feeding in system 1000.

Housing 1100 can comprise a substantially transparent portion 1200, which can define an aperture 1720. Aperture 1720 can be sized to allow passage of small bird, such as bird 1300. Housing 1100 can define a feeding chamber 1520 and a floor opening 1800. Aperture 1720 can be one of a plurality of apertures 1700 via which bird 1300 can enter or exit housing 1100. Housing 1100 can comprise a hinged roof 1120. Hinged roof 1120 can be adapted to open such that a user has access to clean system 1000. Housing 1100 can comprise a slidably removable floor 1140 and a ceiling 1740. Each of removable floor 1140, ceiling 1740 and transparent portion 1200 can be adapted to be nondestructively installed in grooves of housing 1100. Compartmented carousel 1240 can comprise a plurality of compartments. A portion of housing 1100 can be adapted to substantially surround compartmented carousel 1240. Compartmented carousel 1240 can be heated and/or cooled. System 1000 can comprise one or more gears 1250, which can be operatively coupled to compartmented carousel 1240. Battery powered motor 1260 can be operatively coupled to gears 1250. Battery powered motor 1260 can be adapted to cause compartmented carousel 1240 to rotate. Timer 1280 can be adapted to start and stop battery powered motor 1260 to sequentially expose a compartment of the plurality of compartments of compartmented carousel 1240 to bird 1300 through floor opening 1800.

System 1000 can comprise a bell 1920, which can be adapted to provide an audible signal to bird 1300 that the compartment of the plurality of compartments is exposed to bird 1300 through floor opening 1800. The compartment of the plurality of compartments can be exposed to bird 1300 at a predetermined time interval except for exposed compartment 1400. Compartmented carousel 1240 can be substantially concealed from bird 1300.

Figure 2:
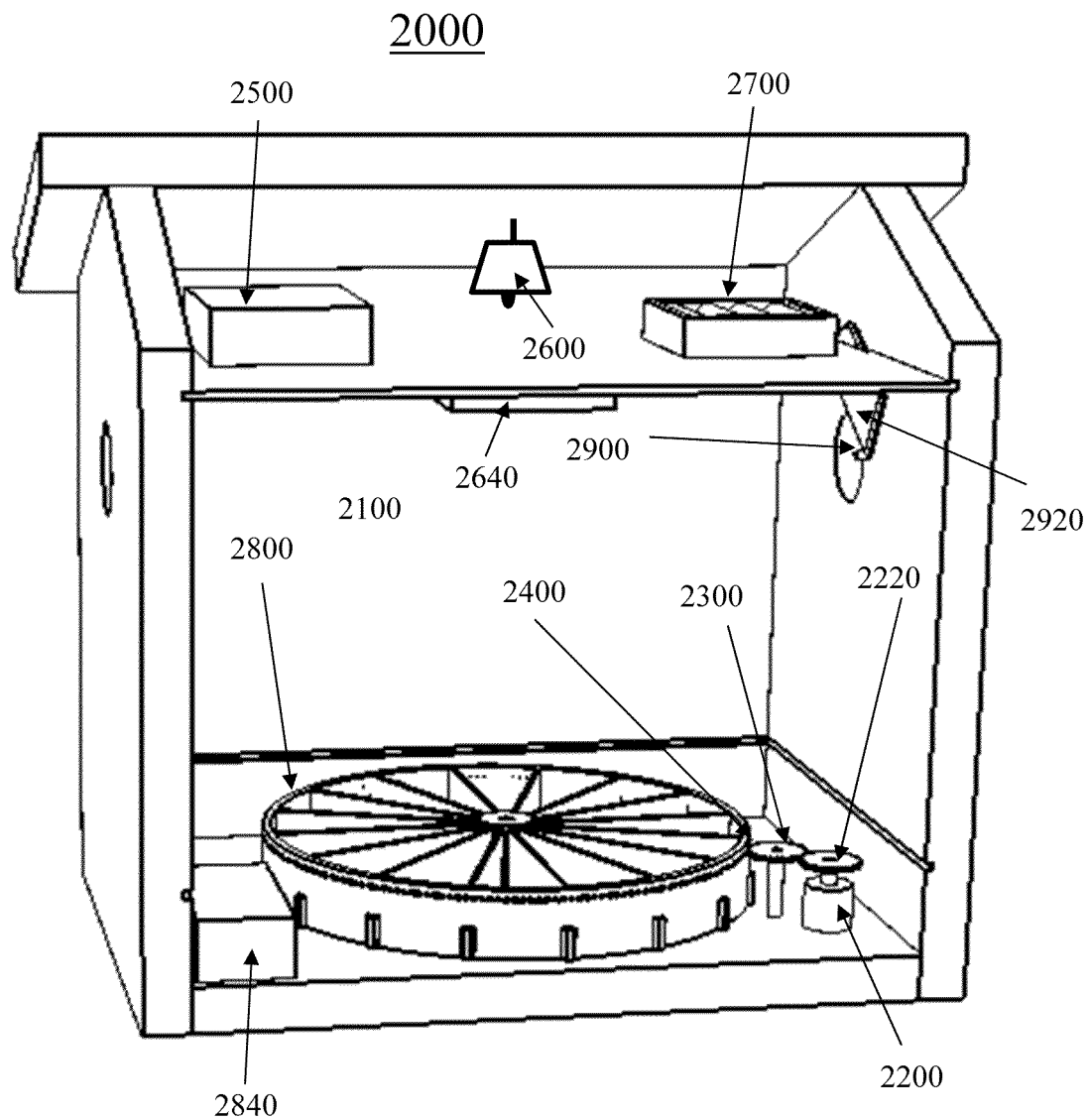
FIG. 2 is a drawing of a perspective view of an exemplary embodiment of a system 2000.

FIG. 2 is a drawing of a perspective view of an exemplary embodiment of a system 2000, which is illustrated without a floor with half of the roof shown as cut away for illustrative purposes. System 2000 can comprise one or more apertures 2900. In certain exemplary embodiments, apertures 2900 can be associated with aperture covers 2920, which can be adapted to be automatically closed by a closing mechanism, which can receive energy from an energy source 2700. In certain exemplary embodiments, energy source 2700 can comprise batteries, which can be rechargeable. In certain exemplary embodiments, batteries comprised by energy source 2700 can be recharged via a solar cell such as solar cell 1940 of FIG. 1. Closing mechanism 2700 can be battery powered and can close aperture cover 2920 responsive to a signal from a user and/or an automatic detection of an unwanted bird species (e.g., a sparrow or starling, etc.). When all aperture covers 2920 are closed, all or part of housing 2100 can be a capture compartment. Certain exemplary embodiments can comprise a partition (not illustrated) that can result in a smaller capture compartment. System 2000 can comprise an annunciator 2600, which can be any device or system capable of emitting an audible sound. For example, annunciator 2600 can be a bell, buzzer, speaker, and/or miniature electronic music player, etc. System 2000 can comprise a motion sensor 2640, which can be adapted to detect the presence of a bird in system 2000 and can activate annunciator 2600.

System 2000 can comprise a compartmented carousel 2800, which can be driven by a battery powered motor 2200. Battery powered motor 2200 can be operatively coupled to a first gear 2220. First gear 2220 can be operatively coupled to, and aligned with, a second gear 2300. Second gear 2300 can engage and mesh with a toothed ring 2400 of compartmented carousel 2800. Battery powered motor 2200 can rotate compartmented carousel 2800 via first gear 2220, second gear 2300, and toothed ring 2400. Certain exemplary embodiments can comprise a single gear, while other embodiments can comprise three or more gears. System 2000 can comprise an electronics module 2500, which can be adapted to control motion of compartmented carousel 2800, a loudness of annunciator 2600, and/or an environmental control sub-system 2840. In certain exemplary embodiments, environmental control system 2840 can be adapted to heat and/or cool compartmented carousel 2800 to keep living organisms alive in compartmented carousel 2800.

Certain exemplary embodiments can comprise a substantially transparent capture compartment, which can be adapted to restrain a bird from exiting once the bird is in the capture compartment.

Figure 3:
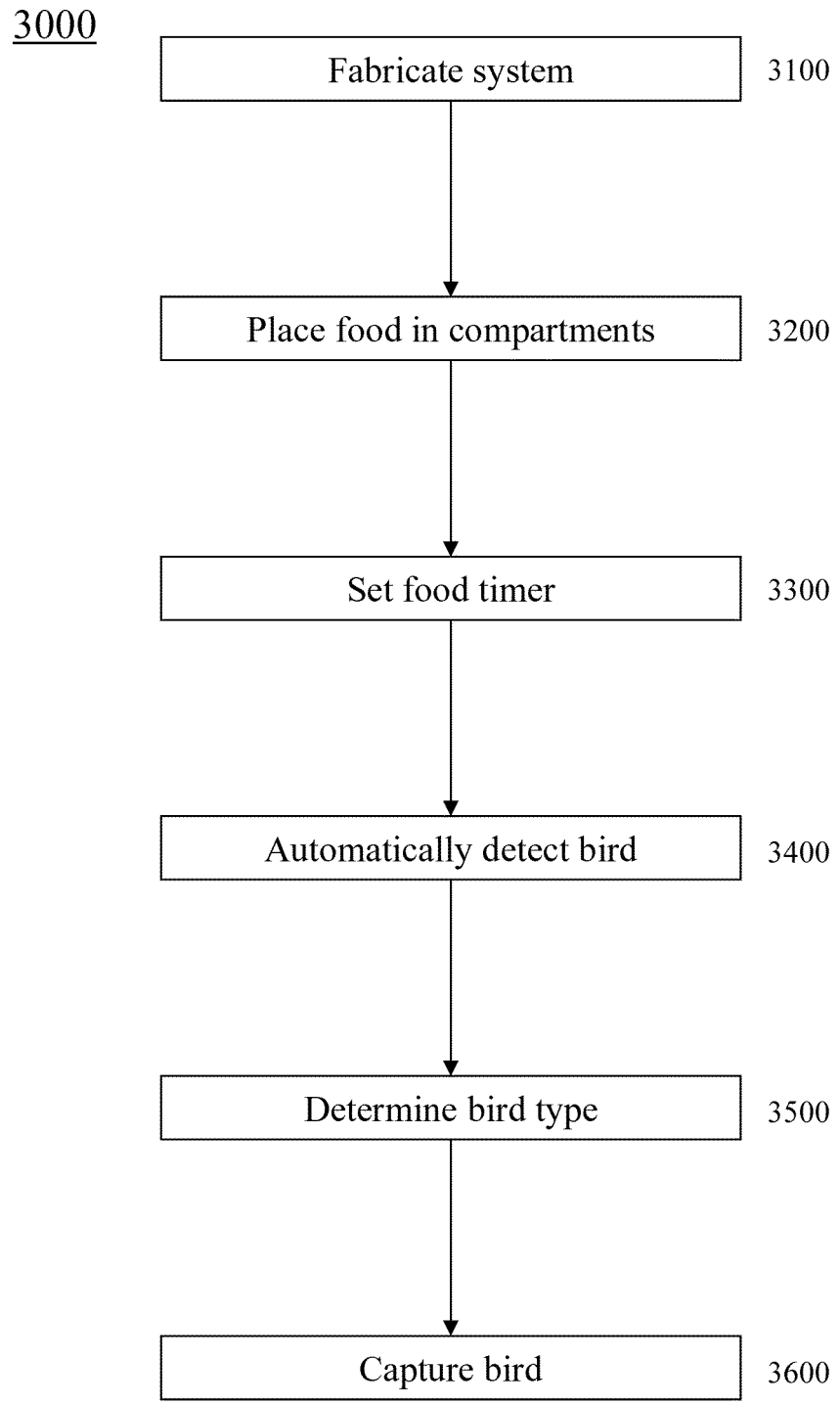
FIG. 3 is a flowchart of an exemplary embodiment of a method 3000.

FIG. 3 is a flowchart of an exemplary embodiment of a method 3000. At activity 3100, a bird feeder system can be fabricated. The bird feeder system can comprise an automatically rotatable carousel. The carousel can define a plurality of compartments, each of which can hold a fresh food supply such as living organisms. Each of the compartments of the rotatable carousel can be sequentially exposed to a compartment into which birds can ingress and egress.

At activity 3200, food (variety of insects) can be placed into each of the plurality of compartments. At activity 3300, a user can set a food timer. The food timer can be adapted to trigger turning of the carousel to sequentially expose each of the compartments of the rotatable carousel to feeding birds.

At activity 3400, a bird can be automatically detected, such as via a motion sensor. The motion sensor can be adapted to trigger an alarm to alert the user of the presence of the bird in the bird feeder system. At activity 3500, the user can observe the bird responsive to the alert and can determine the type of the bird. At activity 3600, the bird can be captured by the user in a compartment of the bird feeder system.

Certain exemplary embodiments can automatically detect a presence of a bird in a housing, such as via a motion sensor. The housing can be adapted to substantially surround the bird. The housing can define an aperture adapted for the bird to enter and/or exit the housing. A compartmented carousel can be within the housing and can be adapted to rotate to expose a compartment of a plurality of compartments defined by the compartmented carousel to the bird. The compartmented carousel can be automatically rotated such as responsive to the automatic detection of the bird. A user can be instructed to place food in the compartmented carousel. The user can be instructed to adjust a timer adapted to trigger turning of the compartmented carousel. The bird can be caused to be captured in a capture compartment defined by the housing. An audible signal can be caused when the compartment of the plurality of compartments is available to the bird. The audible signal can be caused when the compartment of the plurality of compartments is filled with food. An audible signal can be caused when the bird is detected in the housing.

Certain exemplary embodiments provide a bird feeder, which can provide birds with live insects. The bird feeder can be designed specifically for certain species of birds. Traditional food or live insects can be provided to birds. Food items such as mealworms can be stored without escape or dying for several days and then presented for consumption. Food can be made available at predetermined intervals.

Many birds such as bluebirds, wrens, etc. are primarily insect eaters so it is very difficult to attract these types of birds to a feeding station. Bird feeders that dispense birdseed generally do not attract such birds. If insects such as mealworms are provided in a tray or bowl, larger birds will usually scare off the smaller birds and eat most or all of the mealworms before the smaller birds can feed.

Current feeders for mealworms don't keep the worms alive for very long. Feeders are made out of clear plastic, which lets the sun shine through the roof or sides thereby heating up and destroying the worms faster. Also, some feeders don't limit the size of bird that can feed.

Certain exemplary embodiments limit the size of bird that can enter the feeder.

Certain exemplary embodiments keep the insects fed and alive for days.

Certain exemplary embodiments use different types of insects. For example, mealworms, crickets, and/or grass hoppers, etc.

Certain exemplary embodiments load the feeder with food and then let it operate automatically for several days to provide food once a day or several times a day depending on the program of choice.

Certain exemplary embodiments notify the birds when food is available by an audio announcement. In this case a bell rings but the audio announcement can be anything.

Certain exemplary embodiments provide a sparrow trap to remove sparrows from the area.

Certain exemplary embodiments provide notice of when birds have entered the feeder.

Certain exemplary embodiments use building materials that won't warp, rot, or rust and never need to be painted and/or repainted.

The feeder can be built out of materials that resist the elements of the weather such as plastic, aluminum, stainless steel, etc. Holes in the external walls of the feeder limit the size of the birds that enter. At least one wall is substantially clear plastic so the birds can be viewed while they feed. The feeder can use traditional food such as suet, dried mealworms, and/or fruits, etc. as well as live insects such as mealworms, crickets, grasshoppers, and/or beetles, etc.

The feeder easily comes apart for refilling with food or for cleaning. The roof is hinged, the clear wall slides up and out using two vertical grooves that are cut into the walls. The floor and ceiling slide out using two horizontal grooves that are cut into the same walls. The insect wheel can be removed for easy refilling and then placed back into the feeder when loaded.

The live insects are stored under the floor of the feeder and out of the elements. A rotating wheel is divided into compartments that are presented to the birds one at a time at timed intervals depending on the program that is selected. The timer can be electric or mechanical or a combination of both. The compartments contain food for the insects to sustain them for days. The feeder may contain a heat source to keep the insects from freezing in the winter and a cooling feature that keeps them for roasting in the summer.

The power source for the feeder can be batteries, solar, fuel cell, wind, any form of potential energy such as a raised weight or coiled spring or a combination of several of these.

One of the unique features of this feeder is the sparrow trap. House sparrows are not native to North America; they were brought to the US from Europe. They are fierce enemies of native birds such as martins, bluebirds, wrens and other small birds. They are not protected by law and can be destroyed. This feeder has the capability of capturing sparrows. The sparrow is then transferred to a holding cage where it can be disposed of properly.

The feeder can utilize sensors such as motion, touch including capacitive, optical including cameras for shape or pattern recognition, heat including inferred, pressure, RFID (Radio-Frequency Identification) tag etc. Any sensor can be wired or wireless. A camera may be a webcam.

The feeder can utilize remote control technology for rotating the insect wheel, capturing sparrows, taking pictures, and/or live video, etc.

One of the unique features of this feeder is the notification that it sends wirelessly notifying a user that birds are in the feeder. This is accomplished through the motion sensor that sends a radio signal to a receiver of the user that sets off an alarm, such as a chime. Then the bird can be identified and if it's a sparrow it can be captured.

Another unique feature of the feeder is its capability to notify the birds when live insects are available. Every time the insect wheel rotates an audio sound can be generated for the birds to hear. Birds will soon learn what the sound means.

The feeder may have a feature that captures insects in the day or at night and then presents them to the birds for consumption.

The prototype feeder has been in used since 2010 and works very well. Even unattended for two weeks the feeder continues to feed the birds live insects at least once a day.

Figure 4:
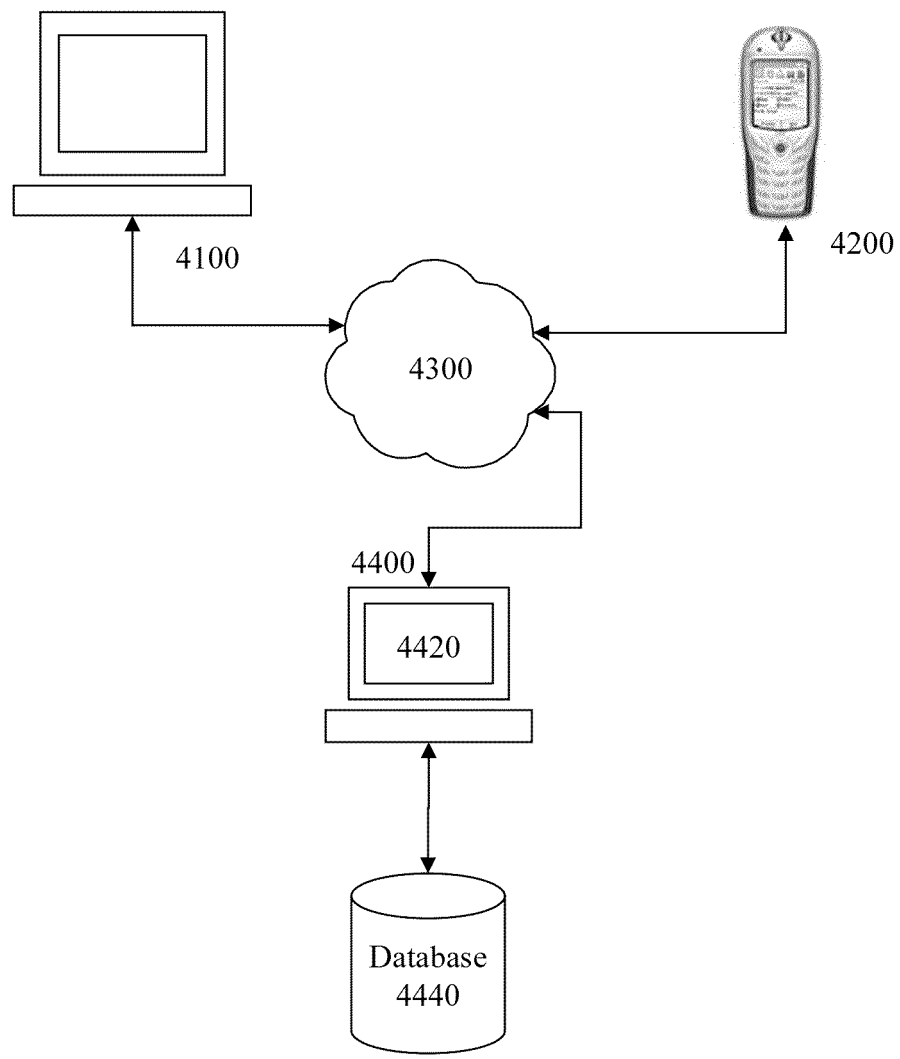
FIG. 4 is a block diagram of an exemplary embodiment of a system 4000.

FIG. 4 is a block diagram of an exemplary embodiment of a system 4000, which can comprise an information device 4100, which can be adapted to receive a signal from and/or send a signal to a bird feeder system, such as system 1000 of FIG. 1. Information device 4100 can be communicatively coupled, via a network 4300, to a personal data accessory 4200, which can be a smart phone in certain exemplary embodiments. For example, a user can receive a signal from system 1000 indicating the presence of bird 1300 in housing 1100. Information device 4100 and/or personal data accessory 4200 can be used to adjust and/or trigger a timer in system 1000 in order to expose a new compartment of food for access by bird 1300. As another example, information device 4100 can be communicatively coupled (e.g., wirelessly) to electronics module 2500 of FIG. 2 and can provide information and/or settings associated with the control of system 2000. System 4000 can comprise a server 4400, which can comprise a user interface 4420. Server 4400 can be communicatively coupled to a database 4440, which can act as a repository for information obtained from system 1000.

Figure 5:
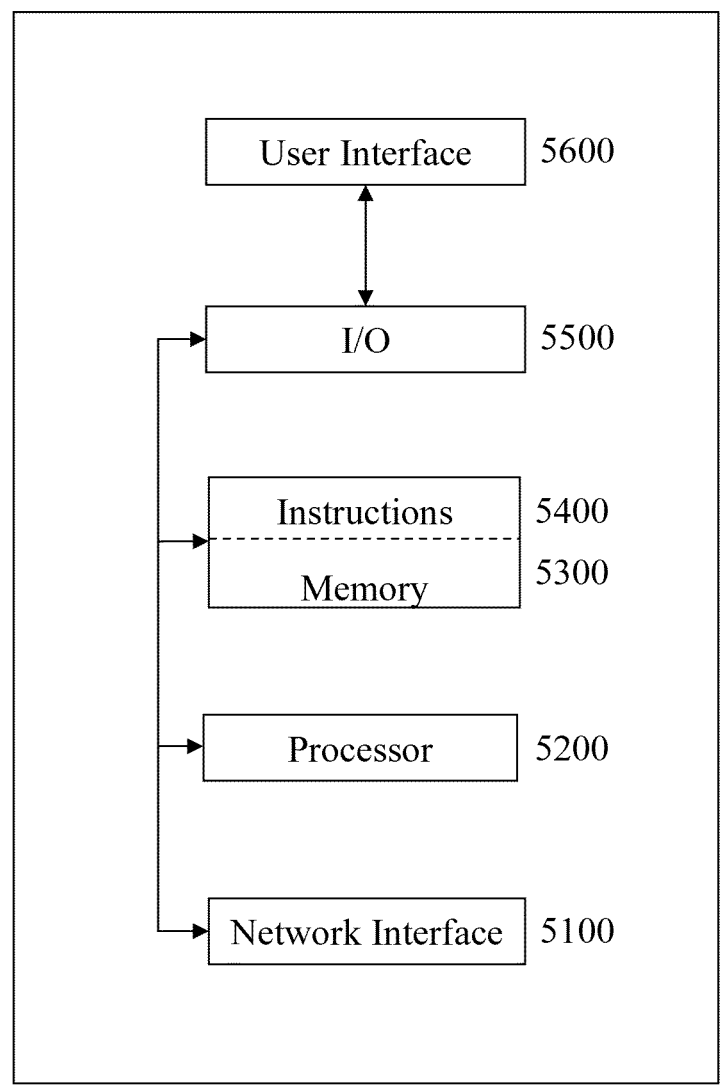
FIG. 5 is a block diagram of an exemplary embodiment of an information device 5000.

FIG. 5 is a block diagram of an exemplary embodiment of an information device 5000, which in certain operative embodiments can comprise, for example, server 4420 or information device 4100, of FIG. 4. Information device 5000 can comprise any of numerous circuits and/or components, such as for example, one or more network interfaces 5100, one or more processors 5200, one or more memories 5300 containing instructions 5400, one or more input/output (I/O) devices 5500, and/or one or more user interfaces 5600 coupled to I/O device 5500, etc.

In certain exemplary embodiments, via one or more user interfaces 5600, such as a graphical user interface, a user can view a rendering of information related to a bird feeding system such as system 1000 of FIG. 1.

DEFINITIONS

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.
activity—an action, act, step, and/or process or portion thereof.
adapted to—made suitable or fit for a specific use or situation.
adapter—a device used to effect operative compatibility between different parts of one or more pieces of an apparatus or system.
adjust—to change a setting of.
and/or—either in conjunction with or in alternative to.
aperture—an opening.
apparatus—an appliance or device for a particular purpose.
audible signal—a noise that can be heard by a human or animal.
automatically—acting or operating in a manner essentially independent of external influence or control. For example, an automatic light switch can turn on upon "seeing" a person in its view, without the person manually operating the light switch.
available—readily accessible.
battery powered motor—a system that uses electrical energy from an electrolytic cell to impart motion to something.
bell—a device or system adapted to generate a noise that is audible to a human or an animal.
can—is capable of, in at least some embodiments.
capture—to snare or gain control over.
capture compartment—a chamber adapted to prevent escape.
cause—to produce an effect.
carousel—a revolving structure in which items can be placed.
clean—to remove dirt or extraneous substances.
compartmented—having a plurality of chambers.
comprising—including but not limited to.
conceal—to hide.
configure—to make suitable or fit for a specific use or situation.
connect—to join or fasten together.
cool—to lower a temperature of.
couple—to join, connect, and/or link together in some fashion.
define—to establish the outline, form, or structure of.
detect—to discover or ascertain the presence of.
determine—to obtain, calculate, decide, deduce, and/or ascertain.
device—a machine, manufacture, and/or collection thereof.
enter—to go into.
exit—to go out of.
expose—to present to view and contact with.
feeding chamber—a compartment were food is placed.
fill—to place substances in to substantially occupy available space.
floor—a substantially level surface upon which birds stand when in a housing.

gear—a part, as a disk, wheel, or section of a shaft, having cut teeth of such form, size, and spacing that they mesh with teeth in another part to transmit or receive force and impart motion.

groove—a long, narrow cut or indentation in a surface, as the cut in a board to receive the tongue of another board.

haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

heat—to increase a temperature of.

hinged—a jointed device on which a door, gate, shutter, lid, or other attached part turns, swings, or moves.

housing—a shelter adapted to keep an animal or human at least in part from environmental elements.

information device—any device capable of processing data and/or information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

instruct—to furnish with directions.

install—to connect or set in position and prepare for use.

machine instructions—directions adapted to cause a machine, such as an information device, to perform one or more particular activities, operations, or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

machine readable medium—a physical structure from which a machine can obtain data and/or information. Examples include a memory, punch cards, etc.

may—is allowed and/or permitted to, in at least some embodiments.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

motion sensor—a system adapted to generate a signal in response to detecting a movement of something.

network—a communicatively coupled plurality of nodes. A network can be and/or utilize any of a wide variety of sub-networks, such as a circuit switched, public-switched, packet switched, data, telephone, telecommunications, video distribution, cable, terrestrial, broadcast, satellite, broadband, corporate, global, national, regional, wide area, backbone, packet-switched TCP/IP, Fast Ethernet, Token Ring, public Internet, private, ATM, multi-domain, and/or multi-zone sub-network, one or more Internet service providers, and/or one or more information devices, such as a switch, router, and/or gateway not directly connected to a local area network, etc.

network interface—any device, system, or subsystem capable of coupling an information device to a network. For example, a network interface can be a telephone, cellular phone, cellular modem, telephone data modem, fax modem, wireless transceiver, Ethernet card, cable modem, digital subscriber line interface, bridge, hub, router, or other similar device.

opening—a gap, hole, or aperture.

operatively—in a manner allowing for operation.

place—to position something.

plurality—the state of being plural and/or more than one.

predetermined—established in advance.

presence—a state of existing at a location.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

provide—to furnish, supply, give, and/or make available.

receive—to get as a signal, take, acquire, and/or obtain.

removable—capable of being taken apart in a substantially non-destructive manner.

render—to make perceptible to a human, for example as data, commands, text, graphics, audio, video, animation, and/or hyperlinks, etc., such as via any visual, audio, and/or haptic means, such as via a display, monitor, electric paper, ocular implant, cochlear implant, speaker, etc.

request—to express a desire for and/or ask for.

restrain—to limit or hamper movement.

roof—an upper covering of a housing.

rotate—to cause to turn around an axis.

set—a related plurality.

signal—information, such as machine instructions for activities and/or one or more letters, words, characters, symbols, signal flags, visual displays, and/or special sounds, etc. having prearranged meaning, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

slidably—capable of being moved along in substantially continuous contact with a relatively smooth surface.

store—to place, hold, and/or retain data, typically in a memory.

substantially—to a great extent or degree.

support—to bear the weight of, especially from below.

surround—to enclose on substantially all sides.

system—a collection of mechanisms, devices, machines, articles of manufacture, processes, data, and/or instructions, the collection designed to perform one or more specific functions.

time interval—a time period.

timer—system adapted to monitor time and provide a signal at a predetermined time or time interval.

transmit—to send as a signal, provide, furnish, and/or supply.

transparent—capable of being seen through by a human or animal.

trigger—to initiate an event.

turn—to cause a rotation of.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

via—by way of and/or utilizing.

wall—an upright construction having a length much greater than the thickness and presenting a continuous surface except where pierced by apertures, windows, etc.; used for shelter, protection, to support floors, roofs, or the like, to fence in an area, etc.

weight—a value indicative of importance.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

no characteristic, function, activity, or element is "essential";

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A system comprising:
a housing, said housing comprising a substantially transparent portion, said substantially transparent portion defining an aperture, said aperture sized to allow passage of a small bird, said housing defining a feeding chamber and a floor opening;
a compartmented carousel, said compartmented carousel comprising a plurality of compartments, a portion of said housing adapted to substantially surround said compartmented carousel;
a set of gears, said set of gears operatively coupled to said compartmented carousel;
a battery powered motor, said battery powered motor operatively coupled to said set of gears, said battery powered motor adapted to cause said compartmented carousel to rotate;
a timer, said timer adapted to start and stop said battery powered motor to sequentially expose a compartment of said plurality of compartments of said compartmented carousel to said small bird through said floor opening;
a bell, said bell adapted to provide an audible signal to birds that said compartment of said plurality of compartments is exposed to said small bird through said floor opening; and
a substantially transparent capture compartment, said substantially transparent capture compartment adapted to restrain said small bird from exiting once said small bird is in said capture compartment.

2. The system of claim 1, wherein:
said compartment of said plurality of compartments is exposed to said small bird at a predetermined time interval.

3. The system of claim 1, wherein:
except for said exposed compartment, said compartmented carousel substantially concealed from said small bird.

4. The system of claim 1, wherein:
said aperture is one of a plurality of apertures via which said small bird can enter or exit said housing.

5. The system of claim 1, wherein:
said housing comprises a hinged roof, said hinged roof adapted to opened such that a user has access to clean said system.

6. The system of claim 1, wherein:
said housing comprises a slidably removable floor, ceiling and a slidably removable wall, each of said removable floor, ceiling and said removable wall adapted to be nondestructively installed in grooves of said housing.

7. The system of claim 1, wherein:
said compartmented carousel is heated.

8. The system of claim 1, wherein:
said compartmented carousel is cooled.

9. The system of claim 1, further comprising:
a capture compartment, said capture compartment adapted to restrain said small bird from exiting once said small bird is in said capture compartment.

10. A method comprising a plurality of activities, comprising:
automatically detecting a presence of a bird in a housing, said housing adapted to substantially surround said bird, said housing defining an aperture adapted for said bird to enter and exit said housing, a compartmented carousel within said housing adapted to rotate to expose a compartment of a plurality of compartments defined by said compartmented carousel to said bird; and
automatically rotating said compartmented carousel responsive to said automatic detection of said bird.

11. The method of claim 10, further comprising:
instructing a user to place food in said compartmented carousel.

12. The method of claim 10, further comprising:
instructing a user to adjust a timer adapted to trigger turning of said compartmented carousel.

13. The method of claim 10, further comprising:
causing said bird to be captured in a capture compartment defined by said housing.

14. The method of claim 10, further comprising:
causing an audible signal when said compartment of said plurality of compartments is available to said bird.

15. The method of claim 10, further comprising:
causing an audible signal when said compartment of said plurality of compartments is filled with food.

16. The method of claim 10, further comprising:
causing an audible signal when said bird is detected in said housing.

17. The method of claim 10, wherein:
said automatic detection is via a motion sensor.

\* \* \* \* \*